INCONSISTENT PARITY CHECK
Filed April 29, 1964
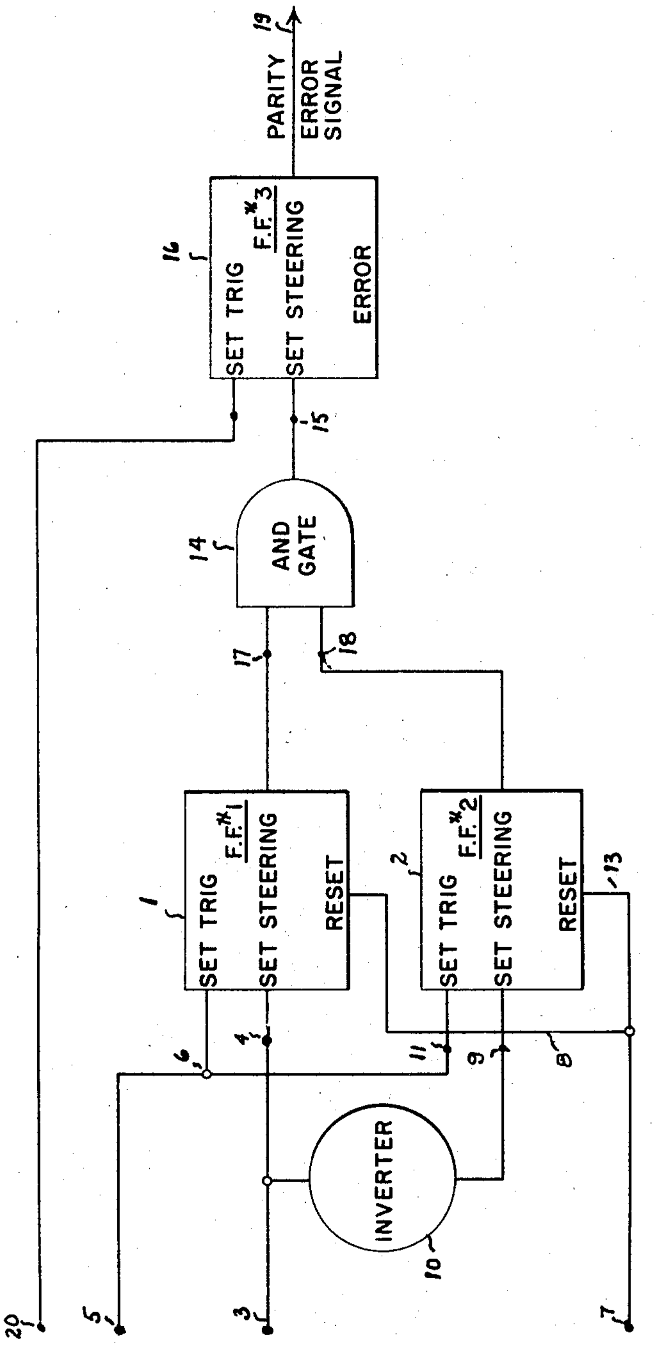
INVENTOR:
FLOYD B. ROBBINS,
BY I. David Blumenfeld
HIS ATTORNEY.

United States Patent Office 3,404,372

Patented Oct. 1, 1968

3,404,372

INCONSISTENT PARITY CHECK

Floyd B. Robbins, Lynchburg, Va., assignor to General Electric Company, a corporation of New York Filed Apr. 29, 1964, Ser. No. 363,365
5 Claims. (Cl. 340—146.1)

ABSTRACT OF THE DISCLOSURE

A parity-checking circuit which senses the internal consistency of the character parity within a record or block of characters, rather than determining whether the parity is odd or even. A pair of flip-flops are provided which are responsive respectively to the presence of odd and even parity. The outputs of the odd and even parity flip-flops are connected to an AND GATE which is actuated *only* if both the odd and even flip-flops are set during a record or block of characters indicating that the block of characters contains both odd and even parity. The AND GATE actuates an error-indicating flip-flop which is set only if the character parity within a record or block is inconsistent; i.e., contains characters with both odd and even parity. Thus, the parity-checking circuit does not require prior identification of the precise type of parity being utilized.

The invention relates to digital data handling circuitry and more particularly to a character parity checking circuit capable of operating with both odd and even character parities.

In digital data processing equipment, whether in a computer or other processing equipment, information in the form of a combination of individual digital bits is transmitted, read, written, stored, and processed in various ways. If such equipment were one hundred percent accurate and one hundred percent reliable, data would always be processed in an error free manner. However, since the accuracy and reliability of the processing equipment is not one hundred percent, provision must be made for periodically checking the digital information against some standard or reference to determine whether the received or processed information is correct. To this end, it is customary in data processing systems to introduce a degree of redundancy into the digital information and to utilize this redundant characteristic to check the accuracy of the information. Thus, for example, a redundant check bit, which is customarily referred to as a parity bit, is added to each code character, no matter what the character length, so that each character always has, depending on the parity scheme selected, either an even or odd number of binary ONE ("1") bits. The digital characters are then checked for parity each time they are read, transferred, or written to determine whether the most common form of equipment malfunction has occurred, i.e., an error in one binary digit of a code character. The two most common types of parity schemes are the binary code or odd character parity wherein every character has an odd number of ONE ("1") bits, and the BCD or even character parity wherein every character has an even number of ONE ("1") bits. With odd parity, for example, any digital character having an even number of ONE ("1") bits has a ONE ("1") parity bit added thereto to satisfy the odd parity condition. A character already having an odd number of ONE ("1") bits, however, remains unchanged. By selectively adding a parity ONE ("1") bit, each character always contains an odd number of ONE ("1") bits. The character may then be checked for accuracy by determining whether it has an odd number of ONE ("1") bits. If, upon checking, it is determined that an even number of ONE ("1") bits is present, an error indication or signal is generated. Similarly, in BCD code or even character parity, a parity ONE ("1") bit is selectively added to a character so that the number of ONE ("1") bits in each character is always even, and this characteristic is used to check for character errors.

Where digital information is stored on a magnetic tape, read from a magnetic tape for transmission to a computer or other data processing equipment, the digital data is stored on the tape in the form of blocks of data or, as they are more commonly referred to, records. Each record consists of a plurality of individual characters, with each character formed of a predetermined number of digital bits. The character parity within any one record is always either all odd (binary) or all even (BCD). However, character parity may change from record to record. Thus, one record on a tape may be odd or binary parity whereas the succeeding record may be even or BCD parity. The fact that character parity may change from record to record introduces complications in checking the parity of digital data received from a tape for processing.

In one form of hitherto available parity checking circuitry, it is customary to sense character parity error by monitoring or sampling the output of a bistable electrical circuit, such as a Flip-Flop which was Set to produce an output signal, only if a character was present in the record which had the wrong parity. For example, if odd or binary parity was expected, it was customary to monitor the output of a Flip-Flop which changed its state only to a character containing an even number of ONE ("1") bits. If this Flip-Flop was Set, an error signal was produced indicating that there was an error in one of the characters of the record. This parity checking system was perfectly adequate as long as the parity scheme is known before reading. However should the parity scheme change so that the next record had even character parity, for example, the Flip-Flop would, of course, be Set since all the characters in the record, assuming no errors, now contain an even number of ONE ("1") bits. Thus, the character error indications in systems of this sort were highly ambiguous since the error indication might means a normal error due to loss of a character bit or that the parity scheme has changed.

Normal procedure in these prior art devices was, therefore, to back the tape up upon any error indication and to read the record in the other parity mode, i.e., by now sampling the output of another Flip-Flop which is Set only if there are an odd number of binary ONE ("1") bits in the character. If the output of the odd Flip-Flop produces no error indication, it was safe to assume that the previous error indication was due to a change in parity and that there are actually no character parity errors. If, however, both the parity scheme has changed and one or more characters in the record contain an error, the odd parity Flip-Flop still produces an output indicating that at least one character has been received with an odd number of binary ONES ("1's"). This obviously introduces an ambiguity since it is still impossible to determine whether the indication is due to a character error or a parity change from the previous record.

These prior art arrangements, which were based upon reading the magnetic tape record in the same parity as the last successful read was accomplished and re-reading the record in a different parity mode if an error is indicated, therefore, have a serious shortcoming in that an ambiguity is present whenever the parity changes between records, and the record also contains a character error. This shortcoming, of course, is in addition to the basic shortcoming that the read-out procedure must be stopped each time there is an error indication, the tape backed up, and the record then read in a different parity mode in order to distinguish between change in parity mode and transmission errors since this introduces delays. Even though the read-out may be quite rapid, any delay involved in utilizing the operating time of a computer may be quite expensive and, hence, highly undesirable.

In order to avoid some of the difficulties associated with arrangements of the type just described, it has been suggested that special identifying characters be associated with each of the records which indicate the type of parity scheme utilized. These parity identifying characters may be used to adjust the parity checking circuitry in the computer or other data processing equipment automatically so that the record is read in the proper parity mode. While this may be satisfactory for some purposes, it will be obvious that special and additional equipment must be provided to add the identifying character, to identify it, and to modify the parity checking circuitry to switch between modes.

Another approach to the problem has been that the data processing and computer equipment is simply designed to handle one type of parity only, and all data for the equipment must utilize the designated type of parity. While this solves the problem, it also substantially limits the utility and flexibility of the equipment.

Still other systems will handle both types of codes and provide manual switch means for transferring between parity checking modes. In these systems, however, all the records on a given tape must be of the same parity type. As tapes are switched, the type of parity used may be changed if the parity checking mode of the data processing equipment is correspondingly changed. Again this provides a solution for handling of different parity modes. However, the solution is a very limited one in that additional switching equipment must be provided. Furthermore, though different types of parity may be used, only one type of parity is permitted on a given tape or readout tape sequence.

Hence, a need exists for a simple, effective, and inexpensive parity checking circuit arrangement which is capable of handling both parities randomly mixed in successive records within a given tape without having to provide either parity identifying symbols and circuitry or parity mode switching circuits, or means for backing the tape to read a record in both parity modes.

It is a primary object of this invention, therefore, to provide parity checking circuitry which is capable of checking blocks of digital data using different types of parity.

Another object of this invention is to provide parity checking circuitry which automatically accommodates different types of parity without advance knowledge of the parity type or trial-and-error determination.

Still another object of this invention is to provide new and improved parity checking circuitry which is self-adaptive to different types of parity.

Yet another object of this invention is to provide a parity checking circuit arrangement which is free of ambiguity and will provide an error indication only if there has been an error in one of the digital characters of a record and not if the parity mode has changed from that utilized in the previous record.

Other objects and advantages of the instant invention will become apparent as the description thereof proceeds.

In carrying out the various objects and advantages of the instant invention, a parity checking circuit is provided which is based on the principle of sensing the internal consistency of the parity within a record rather than determining whether parity is odd and even. To this end, flip-flops are provided which are respectively responsive to odd and even parity. One flip-flop is triggered or set if the parity of any character is odd, and the other if it is even. The outputs of these two flip-flops are coupled to a gating device which produces an output only if both of the flip-flops have been set. The gating device, in turn, controls an error indicating flip-flop. Thus, an error indication will be produced if, and only if, there is an indication that the character parity within a record is inconsistent; i.e., there are characters within the record with both odd and even numbers of binary ONES ("1's"). This is a positive identification of a character error. As long as the parity within the record is consistent, all odd or all even, the parity checking circuit is positively inhibited from producing a character parity error indication due merely to a change in the parity between records since that is insufficient, in the absence of a character parity error, to actuate the gating circuitry. Only if there is a parity inconsistency within the record will there be a character parity error indication.

The novel features, which are believd to be characteristic of this invention, are set forth with particularity in the appended claims. The invention itself, however, both as to its organization and method of operation, together with further objects and advantages thereof, may best be understood by reference to the following description taken in connection with the accompanying drawings in which:

The sole figure is a block diagram of the parity checking circuitry of the instant invention.

Before proceeding with a detailed description of the parity checking circuitry, and its individual components, it will be useful to provide a short Glossary of terms and the sense of these terms as they are used in this application:

*Glossary*

And Gate—a pulse circuit or network with two or more input lines and one output line which has the property that pulse, signal, or indication is produced on the output line if, and only if, all of the input lines receive pulses or are otherwise activated.

Binary—a sequence of symbols consisting of ONES ("1's") and ZEROS ("0's") (the digits of the binary notation which represent a letter, digit or other character).

Bit—a binary digit; the smallest unit of information; a single pulse in a group of pulses.

Character—a representation of any single symbol (number, letter punctuation symbol, etc.) in a pattern of ONES ("1's") and ZEROS ("0's") representing a pattern of positive and negative states and pulses.

Flip-Flop—an electronic circuit having two stable states characterized by the fact that successive triggering or set pulses are received, the voltage or condition at the output changes and that a reset pulse returns the voltage or condition at the output to the initial state.

FIG. 1, which is the sole figure, illustrates a parity checking circuit constructed in accordance with the instant invention and includes an Odd Parity Flip-Flop 1 (binary code) and an Even Parity Flip-Flop 2 (binary coded decimal—BCD). Flip-Flops 1 and 2 are respectively Set and produce a signal or predetermined voltage level at their output terminals in response to the presence of digital characters having, respectively, odd and even parity. A first input line 3 is connected to Set Steering Terminal 4 of Odd Parity Flip-Flop 1, and a second input line 5 is connected to Set Trigger Terminal 6. The voltage levels on these input lines Set Flip-Flop 1 whenever a character having odd parity is present and has been sensed in suitable sensing equipment, not shown. A third input line 7 is connected to Reset Terminal 8 to Reset the Flip-Flop before the next record is read.

The signal or voltage level at input lead 3 is determined by the parity of the character being read. Customarily, in computing and data processing equipment, any given character is first shifted into a storage register and a suitable circuit, such as a Flip-Flop or other device, determines whether the number of binary ONE ("1") bits in the character is odd or even. If the character parity is odd, the output from the sensing means and, hence, the input to line 3 is of a suitable level and polarity to Set Flip-Flop 1 upon the appearance of a suitable signal or voltage level on line 5 and, hence, at Set Trigger Terminal 6. If, on the other hand, the character parity is even, the input level and polarity on line 3 is such that Flip-Flop 1 cannot be Set upon the appearance of the proper signal or voltage level on input line 5.

Such Set Steering circuits are old and well-known in the art and are based on the principle tht the Flip-Flops may be controlled and their stable states reversed only upon the coincidence of two events. These events being both that a signal of the proper voltage level is applied to the Set Steering terminals and a Set Trigger pulse is applied over line 5 to the Set Triggering terminal. Typically, such a circuit may include a diode coupled to the input of the Flip-Flop. The diode is so poled that it will be conductive and pass an input signal (the Set Triggering pulse applied to one electrode of the Flip-Flop) only if the voltage level at the other of its electrodes is of a given polarity and level. Then, and only then, is the Set Triggering pulse applied to the Flip-Flop to reverse its stable state (i.e., to Set it). Reference is hereby made to a "Handbook of Selected Semiconductor Circuits," Nobsr 73231, prepared by Transistor Applications, Inc., for Bureau of Ships, Department of the Navy, Document Navships 93484, published in 1959, and particularly part 7 thereof entitled "Logic Circuits," pp. 7–1 to 7–14, for a discussion of steering circuits.

The Set Triggering pulse or voltage level applied to Set Triggering Terminal 6 is derived from the data processing or computing equipment, not shown, and may, for example, be the pulse applied to the character storage register to shift the character out of the register prior to the introduction of the next character. If any character in the record has an odd parity, the input to the Set Steering Terminal 4 is of a proper level and polarity so that the signal appearing at line 4 and Set Trigger Terminal 6 Sets Flip-Flop 1. When Flip-Flop 1 is Set, the voltage level and polarity at its output terminal changes to indicate that at least one character in the record has odd parity. Once Flip-Flop 1 has been Set, it remains Set until by the appearance of a Reset pulse or voltage level on line 7 and Reset Terminal 8 the same is Reset. The Reset pulse may preferably be a pulse or voltage level generated whenever the next record on the tape is to be read in response to a start tape instruction from the computer, not shown, to the tape drive mechanism. Thus, whenever the system is ready to read and to check the parity of the next record, Flip-Flop 1 is Reset and is in condition to sample and sense the parity of the characters in the next record.

Even Parity Flip-Flop 2, on the other hand, is Set to produce an output of the proper level and polarity whenever one or more of the characters in a record has even parity. Set Steering Terminal 9 of Flip-Flop 2 is connected to the output of inverter 10 which may be an amplifier or any other device which produces 180° phase inversion of the signal input line 3. Whenever the voltage level and polarity on input line 3 is that for odd character parity so that Flip-Flop 1 may be Set by the trigger pulse at input line 5, the ouput of inverter 10, which is applied to Set Steering Terminal 9 of Flip-Flop 2 is of a level and polarity to prevent Flip-Flop 2 from being Set. Whenever a character, having even parity, is sensed the voltage level and polarity at input lead 3 changes. The output of inverter 10 is now at a level and polarity such that the appearance of the next trigger pulse at input 5, which is also connected to Set Trigger Terminal 11, Sets Flip-Flop 2. Flip-Flop 2 also has a Reset Terminal 13 coupled to line 7 to Reset Flip-Flop 2 whenever a new record is to be read.

The outputs of Flip-Flops 1 and 2 are connected to the input lines of an AND GATE 14, the output of which is connected to the Set Steering Terminal 15 of an error signal generating Flip-Flop 16. AND GATE 14, as is well known, produces an output signal or voltage level only in the event that both of its inputs 17 and 18 are energized by voltages of the proper level and polarity. Only if both Flip-Flops 1 and 2 are Set are the inputs of AND GATE 14 energized. The output of AND GATE 14 determines whether Flip-Flop 16 can be Set to produce a parity error signal at its output lead 19 in response to a Set Trigger pulse on input line 20. The output of AND GATE 14 is of the proper polarity and level to permit error Flip-Flop 16 to be triggered and produce a parity error signal only if both the Odd Parity Flip-Flop 1 and Even Parity Flip-Flop 2 have been Set indicating that the parity within the record is inconsistent and that a character error is present.

The Set Triggering pulse for Flip-Flop 16, which appears on line 20, may, for example, be the pulse which is generated by the data processing equipment or computer whenever the end of a record is reached on the tape. Such a pulse generating equipment, not shown here, is common in data processing equipment and usually consists of equipment which senses the end of any particular record on the tape by sensing or counting a predetermined time interval during which no characters are received. If this period of time passes without the receipt of a character, indicating that the tape has moved into the inter-record space, a pulse is generated which is applied to the tape drive to stop the tape and prevent further movement of the tape until a command is received from the computer to read or write another record. This end-of-record pulse, which is applied to the tape drive, is also applied to the Set Trigger Terminal of Flip-Flop 16 and is effective to Set the Flip-Flop and produce the parity error signal at output lead 19 if, and only if, AND GATE 14 applies a voltage of the proper level and polarity to Set Steering Terminal 15. Of course, as pointed out before, AND GATE 14 is actuated only if both the Odd and Even Parity Flip-Flops 1 and 2 have been Set indicating that a character parity error exists.

The manner in which the circuit illustrated in FIG. 1 operates in order to produce an error signal only in response to the presence of a parity error in one of the characters and not in response to a change in the type of parity between a particular record and the previous record may best be understood in terms of the following discussion of the operation of the system.

Assume, for example, that the previous record has been read and checked for parity and found to be correct and that the character parity in the previous record was odd parity. Assume further that a start tape instruction has come from the computer to a tape drive (not shown) to advance the tape and read the next record. A pulse appears at input lead 7 which Resets both Flip-Flops 1 and 2. Assume also that the next record represents a switch in character parity and that the code within the next record is BCD or even character parity. When the first character from the next record is shifted into character storage register, the input at line 3 is of a level and polarity such that the voltage applied to Set Steering Terminal 4 of Flip-Flop 1 inhibits the Flip-Flop and prevents it from being Set by the character shift pulse on line 5. However, the output from inverter 10 is of a level and polarity such that the appearance of the input pulse on line 5 and at Set Trigger Terminal 11 Sets Flip-Flop 2. The first character having even parity thus Sets Flip-Flop 2 and the voltage level and polarity at its output changes and energizes input Terminal 18 of AND GATE 14. If the next and all succeeding characters in the record have the correct even parity, only Flip-Flop 2 is Set, and Flip-Flop 1 remains in its Reset state. Input Terminal 17 of the AND GATE is not energized, and there is no output from AND GATE 14. The end-of-record pulse on input line 20 is, therefore, incapable of Setting Error Flip-Flop 16 since Set Steering Terminal 15 is not at the required level and polarity. Flip-Flop 16 remains in its Reset state, and no parity error signal is generated at output 19 even though parity has changed from odd to even parity in going from one record to another.

If, however, there is a character parity error in the record so that at least one character has an odd number of binary ONES ("1's"), the signal at input line 3 of Flip-Flop 1 is at the proper level and polarity such to Set Flip-Flop 1 by a character shift pulse on input line 5. Since both Flip-Flops 1 and 2 have been Set, Input Terminals 17 and 18 of AND GATE 14 are both energized. AND GATE 14 produces an output which is applied to Set Steering Terminal 15 of Flip-Flop 16 so that the end-of-record pulse on line 20 Sets Error Flip-Flop 16 and produces a parity error signal at output 19. It can be seen that an error signal is produced only if the parity within a given record is inconsistent indicating the presence of character parity error. As long as the parity of all of the characters in a record is consistent, whether the parity is odd or even, no error signal can be generated since AND GATE 14 is disabled. This holds true whether the previous record had the same character parity or a different type of character parity since the generation of parity error signals depends not upon the detection or sensing of the particular type of parity being used but on the presence of at least two characters of different parity within a single record.

It will be appreciated that a simple, effective parity checking circuit arrangement has been provided which is independent of the type of parity being utilized within any record and which can determine the parity of the character having even parity thus Sets Flip-Flop 2 and the volt-error-free manner.

Without advance knowledge of parity type or manual or automatic trial-and-error determination of parity type, this circuit can detect a parity error and determine the parity (odd or even) of a record or block or group of digital data characters by determining that all of the characters of that record, block or group of characters, are consistently odd or even.

While a particular embodiment of this invention has been shown, it will, of course, be understood that the invention is not limited thereto since many modifications, both in the circuit arrangement and in the instrumentality employed, may be made. It is contemplated by the appended claims to cover any such modifications as fall within the true spirit and scope of this invention.

I claim:

1. In a self-adaptive parity-checking circuit the combination comprising:

(a) means responsive to odd and even character parity respectively;

(b) an input terminal adapted to receive signals of different polarities representing different character parity;

(c) a further terminal adapted to receive a trigger pulse in response to each character in a block of characters and means coupling said further terminal to the input of each of said parity-responsive means;

(d) means coupling said input terminal to both of said parity-responsive means including inverter means coupled between said input terminals and one of the parity-responsive means, whereby the polarity of the parity-representing signals applied to said parity-responsive means is always opposite and one of said parity-responsive means responds only to the simultaneous presence of a trigger pulse and a signal of one polarity and the other of said parity-responsive means responds only to the presence of a trigger pulse and a signal of the opposite polarity;

(e) circuit means coupled to the output of said even and odd character parity means for producing an output only if both said odd and even character parity-responsive means have been actuated in response to the presence of inconsistent character parity in a predetermined block of digital characters, which block is characterized by the fact that the character parity within the block is the same;

(f) means for producing a character parity error signal in response to an output from said circuit means whereby an error signal is produced only in response to character-parity error and not in response to a change in the parity scheme between successive blocks of digital characters; and (g) a reset input terminal coupled to each of said parity-responsive means and adapted to receive a reset pulse representing the end of a block of digital characters of the same parity, said pulse resetting each of said parity-responsive means to their unactuated states to condition said parity-checking circuit for parity-checking operation of the next block of characters.

2. In a self-adaptive parity-checking circuit which produces an error indication only if there is inconsistent parity within a block of data and is positively inhibited if the parity is consistent irrespective of the parity scheme, the combination comprising:

(a) a first trigger circuit for producing an output in response to an input signal representative of a digital character having odd parity;

(b) a second trigger circuit for producing an output in response to an input signal representative of a digital character having even parity;

(c) an input terminal adapted to receive signals of different polarities representing different character parities;

(d) a further terminal adapted to receive a trigger pulse in response to each character in a block of characters and means coupling said further terminals to the input of each of said first and second trigger circuits;

(e) means coupling said input terminal to the input of said first and second trigger circuits, including inverter means coupled between said terminals and one of said first and second trigger circuits, whereby the polarity of the parity-representing signals applied to said first and second trigger circuits is always opposite and one of said first and second trigger circuits responds only to the simultaneous presence of a trigger pulse and a signal of one polarity and the other of said first and second trigger circuits responds only to the presence of a trigger pulse and a signal of the opposite polarity;

(f) circuit means coupled to said first and second trigger means, said circuit means being actuated to produce an output only in response to the simultaneous presence of outputs from both of said trigger circuits thereby indicating that the character parity within a block of data is inconsistent;

(g) error signal trigger means coupled to said circuit means and responsive to the output thereof to produce a character parity error signal only in response to a character parity error and not in response to a change in the parity scheme between successive blocks of characters; and (h) a reset input terminal coupled to the input of each of said first and second trigger circuits and adapted to receive a reset pulse representing the end of a block of digital characters of the same parity; said reset pulse resetting each of said first and second trigger circuits to their unactuated states to condition said parity-checking circuit for parity-checking operation of the next block of characters.

3. In a self-adaptive parity-checking circuit which produces an error indication only if there is inconsistent parity within a block of data and is positively inhibited if the parity is consistent irrespective of the parity scheme, the combination comprising:

(a) means responsive to odd and even character parity respectively to produce individual outputs in response to data characters having odd and even parity;

(b) an input terminal adapted to receive signals of different polarities representing different character parity;

(c) a further terminal adapted to receive a trigger pulse in response to each character in a block of characters and means coupling said further terminals to the input of each of said parity-responsive means;

(d) means coupling said input terminal to both of said parity-responsive means including inverter means coupled between said terminal and one of the parity-responsive means whereby the polarity of the parity-representing signals applied to said respective parity-responsive means is always opposite and one of said parity-responsive means responds only to the simultaneous presence of a trigger pulse and a signal of one polarity and the other of said parity-responsive means responds only to the presence of a trigger pulse and a signal of the opposite polarity;

(e) gating meanns for producing an output signal in response to the simultaneous presence of said individual outputs at its input indicating the presence of inconsistent parity in a block of characters;

(f) means for producing a character parity error signal in response to an output from said circuit means whereby an error signal is produced only in response to character parity error and not in response to a change in the parity scheme between successive blocks of digital characters;

(g) a reset input terminal coupled to each of said parity-responsive means and adapted to receive a reset pulse representing the end of a block of digital characters of the same parity, said reset pulse resetting each of said parity-response means to their unactuated states and terminating any outputs therefrom to condition said parity-checking circuit for parity-checking operation of the next block of characters.

4. The self-adaptive parity checking circuit, according to claim 3, wherein said gating means includes an AND GATE.

5. In a self-adaptive parity-checking circuit which produces an error indication only if there is inconsistent parity within a block of data and is positively inhibited if the parity is consistent irrespective of the parity scheme, the combination comprising:

(a) a first flip-flop for producing an output signal in response to an input signal representative of a digital character having odd parity;

(b) a second flip-flop for producing an output signal in response to an input signal representative of a digital character having even parity;

(c) an input terminal adapted to receive signals of different polarities representing different character parity;

(d) a further terminal adapted to receive a trigger pulse in response to each character in a block of characters and means coupling said further terminals through the input of each of said first and second flip-flops;

(e) means coupling said input terminal to both of said first and second flip-flops including inverter means coupled between said terminal and one of said first and second flip-flops whereby the polarity of the parity-representing signals applied to said flip-flops is always opposite and one of said flip-flops responds only to the simultaneous presence of a trigger pulse and a signal of one polarity and the other of said flip-flops responds only to the presence of a trigger pulse and a signal of the opposite polarity;

(f) an AND GATE coupled to said first and second flip-flops for producing an output only if both of said flip-flops produce an output signal;

(g) a character error flip-flop responsive to the output of said AND GATE for producing a character parity error indication in response to a character parity error and not in response to a change in the parity scheme between successive blocks of characters;

(h) a reset input terminal coupled to each of said first and second flip-flops and adapted to receive a reset pulse representing the end of a block of digital characters of the same parity, said reset pulse resetting each of said flip-flops to their unactuated state and terminating any output signals from said flip-flops to condition said parity-checking circuit for parity-checking operation of the next block of characters.

References Cited

UNITED STATES PATENTS

| | | | |
|---|---|---|---|
| 3,135,945 | 6/1964 | Swanson | 340—146.1 |
| 3,141,962 | 7/1964 | Sakalay | 340—146.1 |
| 3,142,817 | 7/1964 | Jallen | 340—146.1 |
| 3,163,847 | 12/1964 | O'Connor | 340—146.1 |
| 3,200,242 | 8/1965 | Crawford et al. | 340—146.1 |
| 3,221,310 | 11/1965 | Reach | 340—146.1 |
| 3,248,692 | 4/1966 | Wei Ming Shih | 340—146.1 |
| 3,270,318 | 8/1966 | Strawbridge | 340—146.1 |

MALCOLM A. MORRISON, *Primary Examiner.*

C. E. ATKINSON, *Assistant Examiner.*